United States Patent [19]

Hart et al.

[11] 4,141,130
[45] Feb. 27, 1979

[54] METHOD AND APPARATUS FOR CENTERING TWO CONCENTRIC CYLINDERS

[75] Inventors: Milburn L. Hart, La Marque, Tex.; John F. Bridge, Worthington, Ohio

[73] Assignee: H. C. Price Co., Bartlesville, Okla.

[21] Appl. No.: 857,088

[22] Filed: Dec. 5, 1977

[51] Int. Cl.² .......................................... B21C 51/00
[52] U.S. Cl. ......................................... 29/407; 72/37; 29/281.5
[58] Field of Search .............. 72/37; 29/234, 406, 29/407, 455 R, 281.5; 33/174 Q; 356/109, 110, 237, 241, 153, 154, 159, 167, 168; 138/108, 114

[56] References Cited

U.S. PATENT DOCUMENTS

| | | | |
|---|---|---|---|
| 2,205,783 | 6/1940 | Arutunoff | 72/37 |
| 2,864,280 | 12/1958 | Keller et al. | 72/37 |
| 3,604,940 | 9/1971 | Matthews | 356/167 |
| 3,907,435 | 9/1975 | Roodvoets | 356/153 |
| 3,907,438 | 9/1975 | Holeman | 356/167 |

OTHER PUBLICATIONS

Reticon LC 600 Digital Line Scan Camera, Reticon Corporation Brochure, 1975.

*Primary Examiner*—Michael J. Keenan
*Attorney, Agent, or Firm*—Lowe, Kokjer, Kircher, Wharton & Bowman

[57] ABSTRACT

A method and apparatus for centering two concentric cylinders having different diameters is the subject of the present invention. A linear reference line is projected from an illuminating source along the length of the inner cylinder. At the other end of the cylinder is a photo receiver operable to provide a displacement reading related to the amount of light striking the receiver. As the inner cylinder is rotated about its center point, the amount of light striking the photo receiver varies based on the amount of arcuate displacement present at each point of the cylinder. The photo receiver then converts the incoming light into a displacement reading related to the arcuate displacement of the inner cylinder. The readings thus obtained are correlated with the points on the inner cylinder where they occurred to indicate the point and amount of maximum arcuate displacement. Thereafter, the outer cylinder is arcuately displaced a corresponding amount so that it will conform to the inner cylinder exactly.

29 Claims, 4 Drawing Figures

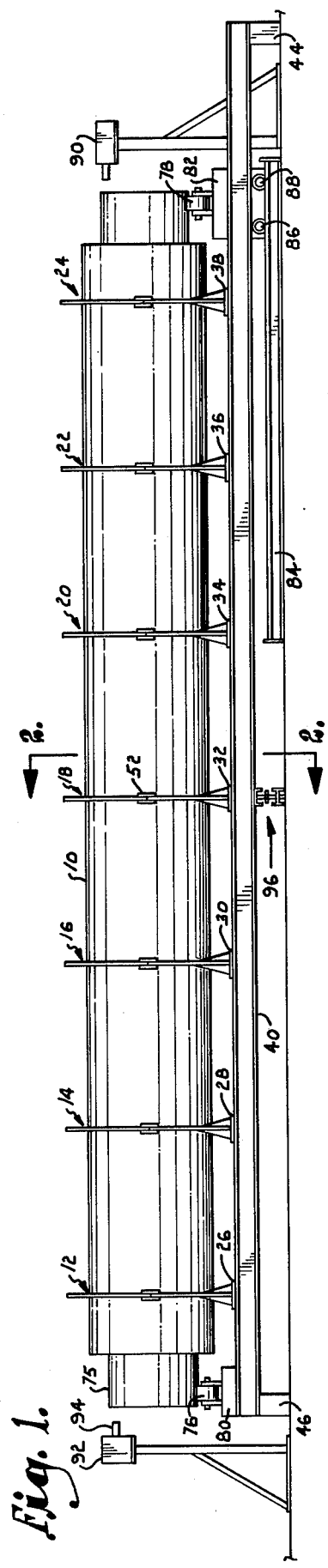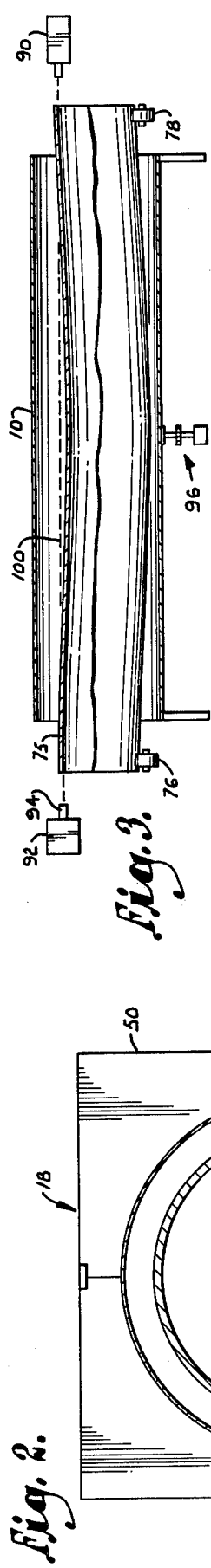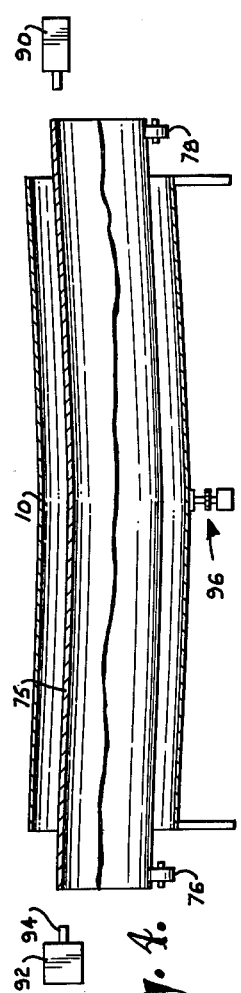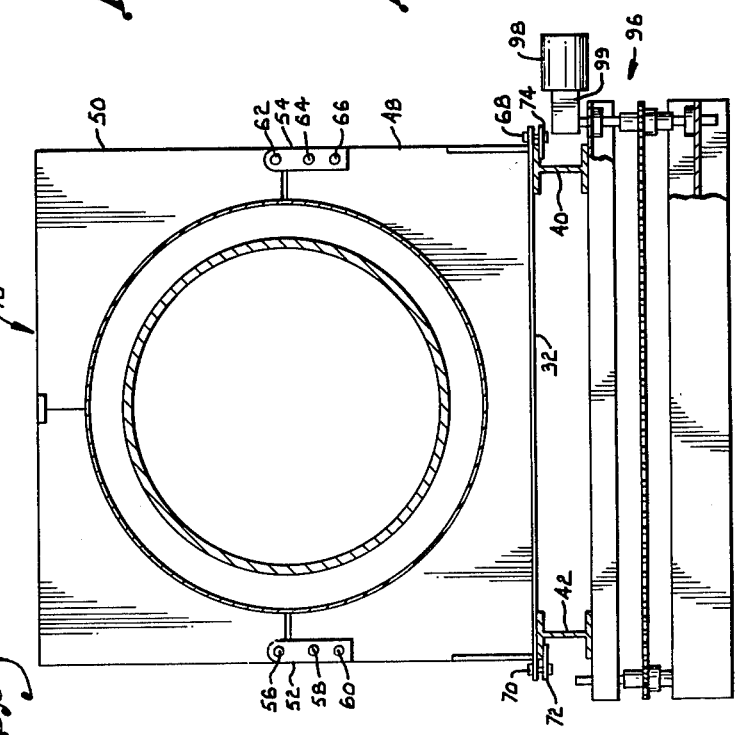

METHOD AND APPARATUS FOR CENTERING TWO CONCENTRIC CYLINDERS

BACKGROUND AND BRIEF DESCRIPTION OF THE INVENTION

This invention relates in general to a method and apparatus for centering two concentric cylinders having different diameters.

Pipelines utilized for the transmission of oil and natural gas sometimes require thermal insulation either to retain heat or to keep a liquified product at a reduced temperature. It has been determined in some instances when an insulated pipeline is disposed above ground it is desirable to place the insulated pipe inside of an outer protective jacket which will prevent ultraviolet degradation of the insulation. It is important that the pipe disposed inside of an outer protective jacket be located concentrically with respect to the latter throughout the length of the pipe so as to assure a uniform thickness of insulation.

The sections of pipe, however, typically include an arcuate displacement which tends to bow this pipe at the center. This arcuate displacement can be rather substantial so that the center section of the pipe is significantly off-center even though the outer ends are properly centered with respect to the outer jacket.

In the prior art, the pipe is centered with respect to the outer jacket by means of a mandrel having mechanical crawlers which are rolled inside of the pipe with feelers that provide a read-out of the distance between the pipe and the outer jacket. This centering technique, however, is very time-consuming and extremely inefficient.

The present invention, on the other hand, centers the pipe within the outer jacket by projecting a linear reference line from an illuminating source along the upper, inner surface of the pipe. This reference line is then received at the other end of the pipe by a photo receiver comprising a linear photodiode array. The photo receiver is capable of detecting the amount of arcuate displacement at any point on the pipe by measuring the place at which the reference line strikes the diode array. The arcuate displacement of the pipe causes the reference line to strike the diode array at varying points which are related to the amount of displacement at that point of the pipe. As the pipe is rotated about its center point, displacement readings are periodically taken. Thereafter, the readings are correlated with the points on the pipe where they occurred to indicate the point and amount of maximum arcuate displacement. Once the amount of arcuate displacement has been determined, the outer jacket is displaced a corresponding amount to correct for the bow in the pipe to creat a relatively uniform area between the pipe and the outer jacket.

This centering apparatus and method can also be used to monitor the amount of pipe movement that occurs during the process of filling the cavity between the pipe and the outer jacket with a foamable liquid. This movement is known as floating and occurs when the filling material causes the inner section of pipe to move within the filling cavity. By using the centering apparatus and technique of the present invention, the extent of this movement can be detected so that the outer jacket can be corrected a corresponding amount.

It is therefore, an object of the present invention to provide a method and apparatus for centering two concentric cylinders having different diameters.

Another object of the present invention is to provide a method and apparatus for centering two concentric cylinders having different diameters which is highly accurate and easy to use.

A further object of the present invention is to provide a method and apparatus for centering two concentric cylinders whereby two sections of pipe having different diameters can be positioned with respect to each other to form a uniform filling cavity between them.

A further object of the present invention is to provide a method and apparatus for centering two concentric sections of pipe whereby the amount of floating or movement of the inner section of pipe during the filling operation can be determined so that the outer jacket can be corrected to maintain the uniformity of the filling cavity.

Other and further objects of the invention, together with the features of novelty appurtenant thereto, will appear in the course of the following description.

DETAILED DESCRIPTION OF THE INVENTION

In the accompanying drawings, which form a part of the specification and are to be read in conjunction therewith and in which like reference numerals are employed to indicate like parts in the various views:

FIG. 1 is a side elevational view of the apparatus for centering two concentric cylinders;

FIG. 2 is an enlarged cross-sectional view taken along 2—2 of FIG. 1;

FIG. 3 is a schematic illustration of the operable relationship between the centering apparatus of the present invention and two cylinders to be centered wherein the inner cylinder is shown with a pronounced arcuate displacement; and FIG. 4 is a schematic illustration of the relationship between two cylinders after they have been centered using the method and apparatus of the present invention.

Referring now to FIGS. 1 and 2, the outer jacket 10 is fixed in place by means of locking collars generally designated by the numerals 12, 14, 16, 18, 20, 22 and 24. These locking collars include support bases 26, 28, 30, 32, 34, 36 and 38, respectively, which rest upon I-beams 40 and 42. The I-beams 40 and 42 are secured to floor mounts 44 and 46 which are anchored in the floor to provide a rigid base for the I-beams.

Support collar 18 is shown in greater detail in FIG. 2. As shown in FIG. 2, support collar 18 is made up of two separate sections 48 and 50 which are arranged to fit securely around the outer jacket 10. The lower section 48 is provided with mounting plates 52 and 54 which are arranged to accept and secure the upper section of the support collar to the lower section of the support collar by means of nut and bolt assemblies 56, 58, 60, 62, 64 and 66. Support base 32 is rigidly secured to I-beams 40 and 42 by means of nut and bolt assemblies 68 and 72 and mounting members 72 and 74.

Returning now to FIGS. 1 and 2, the inner section of pipe 75 is somewhat longer than the outer jacket and is supported at each end by means of roller assemblies 76 and 78. Each of these roller assemblies consists of a pair of rollers (only one roller of each assembly is shown in FIG. 1) which are arranged in spaced apart relationship to form a support upon which the pipe rests so as to allow for rotation of the pipe about its center point. Roller assembly 76 is mounted on a stationary base 80 which is rigidly secured to I-beams 40 and 42. Roller assembly 78, on the other hand, is mounted on moveable base 82 which rides on a track 84 via wheels 86 and 88. A second track and set of wheels is positioned on the other side of moveable base 82 and are not shown in FIG. 1. Roller assembly 78 is mounted in a moveable base so that the centering apparatus of the present invention can accommodate pipe sections of varying length.

An illumination source for projecting the linear reference line along the length of the inner section of pipe and a photo receiver for detecting the amount of arcuate displacement on the section of pipe are provided at 90 and 92 respectively. The illumination source 90 is a suitable light source such as the IS-700 series illumination sources manufactured by Reticon Corporation. The photo receiver, on the other hand, comprises an electronic line scan camera similar to LC-600 Digital Line Scan Camera manufactured by Reticon Corporation. The photo receiver includes an adjustable lens 94 for focusing the camera at a point midway along the length of the inner section of pipe.

A jack generally designated by the numeral 96 is positioned under I-beams 40 and 42 to adjust the arcuate displacement of the outer jacket 10. Since any one of a number of standard jack devices can be used, a detailed description of the design and operation of the jack device will not be undertaken at this time. It should be noted, however, that the jack used in this embodiment of the invention is operated by drive motor 98 which is capable of raising or lowering the jack in response to the rotational direction of its drive shaft 99. Drive motor 98 is controlled by means of a multiple position switch wherein the incremental positions of this switch correspond with the readings of the photo receiver. This switch system provides adjustment of the outer jacket by merely placing the control switch in the switch setting which corresponds to the reading from the photo receiver.

In operation, the illuminating source 90 is positioned at one end of the pipe 75 and is arranged to project a linear reference line along the upper inner surface of this pipe. The light source generates a beam of light having a narrow depth and a width selected in accordance with the anticipated amount of arcuate displacement. In particular, the beam of light has a width slightly greater than the anticipated amount of arcuate displacement and is projected along the upper inner surface of the pipe so that the width of the light beam is perpendicular to a line tangent to a point on the pipe. The light intensity of the illuminating source is determined by the surface of the measured object, the sensitivity and scan rate of the photo receiver, and the f/number and magnification of the selected lens.

The photo receiver 80 is positioned at the other end of the pipe to receive the light beam projected by the illuminating source. The photo receiver is analogous to a photographic camera with the exception that the film plate is replaced by a linear array of photodiodes that are programmed to react to either the absence or presence of light. The linear array includes anywhere from 64 to 1024 diodes in a single line with varying center-to-center spacing. The accuracy of the photo receiver improves as the number of photodiodes increases and the center-to-center spacing between the diodes decreases. Lens 81 focuses the field of view onto the photodiode array causing the light beam to produce a light-to-dark transition at a point on the array related to the amount of arcuate displacement of the pipe. The photo receiver continuously scans the photodiode array to produce a train of analog pulses wherein each pulse has an amplitude proportional to the light intensity on its corresponding photodiode. The amplitude of these analog pulses is then compared with the preset transition value to generate a train of binary pulses having a logic value generated in accordance with the relationship between the amplitude of the analog pulse and the transition value. For example, an analog pulse having an amplitude below the transition value (representing the absence of light) is converted into a logic level zero while a pulse having an amplitude greater than the transition value (representing the presence of light) is converted into a logic level of one. The number of pulses having a logic level one or a logic level zero is then counted to obtain a displacement reading related to the point on the photodiode array where the light-to-dark transition is located.

The photo receiver is aranged with respect to the pipe such that the midpoint of the photodiode array is aligned with the upper inner surface of this pipe and is calibrated to provide incremental readings representative of a specific amount of arcuate displacement. The lens 81 is adjusted to have a focal length proper to focus at a point midway along the length of the inner section of pipe where the arcuate displacement is greatest.

Once illuminating source 90 and photo receiver 92 are properly positioned, the pipe is rotated about its center point from a selected reference position. While the pipe is being rotated, the photo receiver 92 provides a displacement reading related to the amount of arcuate displacement measured during the rotation process. The displacement readings are then correlated with the position on the pipe where they occurred to indicate the point and amount of maximum arcuate displacement. While the inner section of pipe can be rotated in a number of different manners, the preferred technique is to rotate the pipe 180° in each direction from the weld seam.

Referring now to FIG. 3, the method for measuring the arcuate displacement of the inner section of pipe is shown in greater detail in this figure. As shown in this figure, illuminating source 90 projects a linear reference line represented by the broken line 100 along the upper inner surface of the pipe 75. This reference line is a straight line which corresponds with a section of pipe having no arcuate displacement. Arcuate displacement of the inner section of pipe causes the walls of the pipe to intersect the reference line 100 thereby inhibiting passage of a portion of this beam to the photo receiver 92. Since the reference line consists of a narrow line of light having a width slightly greater than the maximum displacement of the pipe, a small portion of the reference line still strikes the photodiode array of the photo receiver 92 at the point of maximum arcuate displacement. By adjusting lens 81 to focus on the midpoint of the pipe, the light-to-dark transition point (this point results from the arcuate displacement of the pipe blocking a portion of the light to the photo receiver) is distinctly recorded in the photodiode array. The light received by the photo receiver causes a corresponding number of photodiodes to be light activated. By detecting the place where a light-to-dark transition occurs, the photo receiver provides an accurate displacement reading representative of the arcuate displacement of the pipe at that point.

The photo receiver is set up to provide incremental displacement readings representative of a specific amount of arcuate displacement. In the preferred embodiment of the invention, the photo receiver is calibrated to provide ten different digital readings with a reading of "one" signifying the smallest amount of arcuate displacement and a reading of "ten" representing the greatest amount of displacement. The range of anticipated arcuate displacement is then divided into ten displacement segments of equal length with each displacement segment corresponding to a different digital number. In other words, a digital reading of one represents an arcuate displacement of one times the length of a displacement segment while a digital reading of two represents an arcuate displacement of two times the length of a displacement segment and so on.

Once the point of maximum displacement is located, the inner section of pipe is then rotated to that point so that the inner section of pipe is bowed downward as shown in FIG. 3. The jack system 96 is then lowered by an amount related to the measured displacement. Movement of the jack is accomplished by placing the drive motor control switch in the switch position corresponding to the measured amount of arcuate displacement. In the preferred embodiment of the invention, the motor control switch is provided with ten switch positions which correspond to the ten digital readings provided by the photo receiver. Placement of the motor control switch in any one of these switch positions activates the drive motor 98 sufficient to lower the jack by an amount corresponding to the selected switch position. In other words, placement of the motor control switch in the number "one" position lowers the jack by an amount equal to the length of the above mentioned displacement segment while placement of the motor control switch in the number "two" switch position lowers the jack by an amount equal to two times the length of a displacement segment and so on. The weight of the outer jacket 10 causes the I-beams 40 and 42 to maintain contact with the jack mechanism thereby displacing the outer jacket a corresponding amount as shown in FIG. 4. In this way, the inner section of pipe 62 and outer jacket 10 are equidistant from each other at each point.

It should be pointed out at this time that the photo receiver can be calibrated in a number of different ways to provide any number of digital readings. The only restriction is that the switch positions on the motor control switch must correspond to the digital readings from the photo receiver so that the outer jacket is always displaced by an amount equal to the arcuate displacement of the pipe.

In order to insure proper filling of the cavity between the pipe and the outer jacket, the pipe sections must be arranged so that they are bowed downward as shown in FIG. 3. Therefore, the above described centering technique performs two operations essential to the filling operation. First, it measures the amount of pipe deflection so that the outer jacket can be displaced a corresponding amount to ensure that the two sections of pipe are properly positioned with respect to each other. Second, the centering technique ensures that the maximum displacement of the pipe will be bowed downward as shown in FIGS. 3 and 4 so that proper filling of the cavity between the inner section of the pipe and the outer jacket can be successfully accomplished.

The above described centering technique can also be used to monitor the position of the inner section of pipe during the filling process. During the filling process, the inner section of pipe often changes position due to floating. Floating occurs when the inner section of pipe moves within the outer jacket during the filling process. The centering apparatus can be used to continuously monitor the position of the inner section of pipe during the filling operation to determine the amount of floating that occurs.

This monitoring operation is accomplished by first arranging the inner section of pipe and the outer jacket such that they are bowed downward as shown in FIG. 4. Once these pipe sections are arranged in this manner, a monitoring reference point is established. This point is related to the point on the photodiode array where the light-to-dark transition occurs. Thereafter, movement of the inner section of pipe during filling causes the light-to-dark transition point to deviate from the established reference point. This deviation is detected and a figure representative of pipe movement is obtained. The measured amount of pipe movement can then be used to adjust the position of the outer jacket to keep these two sections of pipe centered.

From the foregoing it will be seeen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

We claim:

1. A method for centering two concentric cylinders having different diameters, said method comprising the steps of:
    positioning the cylinder having the smaller diameter within the cylinder having ghe greater diameter so that the ends of said cylinder having a smaller diameter are centered with respect to the cylinder having a greater diameter;
    establishing a linear reference line along the length of one cylinder;
    rotating said one cylinder about its center point;
    determining the arcuate displacement of said one cylinder by detecting the deviation of said one cylinder from said reference line as the cylinder is rotated about its center point; and
    arcuately displacing the other cylinder to conform with the determined displacement of said one cylinder.

2. The method in claim 1 including the step of selecting a rotation reference point on said one cylinder.

3. The method in claim 2 including the step of rotating said one cylinder about its center point from said rotation reference point.

4. The method in claim 2 including the step of rotating said one cylinder about its center point from said rotation reference point 180° in each direction.

5. The method in claim 1 including the step of converting the detected deviation into numerical information representative of arcuate displacement.

6. The method in claim 5 including the step of correlating said numerical information with specific points on said one cylinder.

7. The method in claim 1 wherein said step of establishing a linear reference line comprises the steps of:
locating an energy source at one end of said one cylinder; and
projecting an energy signal from said energy source along the length of said one cylinder.

8. The method in claim 7 wherein said step of determining the arcuate displacement of said one cylinder includes the step of positioning a receiver at the other end of said one cylinder, said receiver being operable to receive the energy signal from said energy source.

9. The method in claim 1 wherein said step for establishing a linear reference line comprises the steps of:
generating a beam of light from an illuminating source, said beam of light having a narrow depth and a width greater than the maximum amount of arcuate displacement; and
projecting said beam of light along he length of said one cylinder so that the width of said beam of light is perpendicular to a line tangent to a point on said one cylinder.

10. The method in claim 9 wherein said step of determining the arcuate displacement of said one cylinder comprises the steps of:
receiving said beam of light at the other end of said one cylinder;
selecting a reference point along the width of said beam of light; and
detecting the deviation from said reference point caused by the arcuate displacement of said one cylinder as the cylinder is rotated about its center point.

11. A method for centering two concentric cylinders having different diameters, said method comprising the steps of:
positioning the first cylinder having the smaller diameter within the second cylinder having the greater diameter so that the ends of said first cylinder are centered with respect to said second cylinder;
establishing a linear reference line along the length of said first cylinder;
rotating said first cylinder about its center point;
determining the arcuate displacement of said first cylinder by detecting the deviation of said first cylinder from said reference line as the cylinder is rotated about its center point; and
arcuately displacing said second cylinder to conform with the determined displacement of said first cylinder.

12. The method in claim 11 including the step of positioning said second cylinder on a support frame so as to eliminate an arcuate displacement of said second cylinder.

13. The method in claim 12 wherein said step of arcuately displacing said second cylinder comprises the steps of:
determining from the detected deviation the point on said first cylinder where the maximum amount of arcuate displacement occurs;
determining from the detected deviation the maximum amount of arcuate displacement;
positioning said first cylinder such that said first cylinder is arcuately displaced by its maximum amount in a set direction; and
displacing said second cylinder at the center in said set direction by an amount related to the maximum arcuate displacement of said first cylinder while keeping the ends of said second cylinder stationary.

14. The method in claim 12 wherein said step of arcuately displacing said second cylinder comprises the steps of:
converting the detected deviation into numerical information representative of arcuate displacement;
correlating said numerical information with specific points on said first cylinder;
determining from the correlated numerical information the point on said first cylinder where the maximum amount of arcuate displacement occurs;
determining from said numerical information the maximum amount of arcuate displacement;
positioning said first cylinder such that said first cylinder is arcuately displaced by its maximum amount in a set direction; and
displacing said second cylinder at the center in said set direction by an amount related to the maximum arcuate displacement of said first cylinder while keeping the ends of said second cylinder stationary.

15. The method in claim 12 wherein said step of arcuately displacing said second cylinder comprises the steps of:
determining from the detected deviation the point on said first cylinder where the maximum amount of arcuate displacement occurs;
obtaining from the detected deviation a digital figure representative of the maximum amount of arcuate displacement;
positioning said first cylinder such that said first cylinder is arcuately displaced by its maximum amount in a set position; and
displacing said second cylinder at the center in said set direction in response to said digital figure while keeping the ends of said second cylinder stationary.

16. The method in claim 12 wherein said step of arcuately displacing said second cylinder comprises the steps of:
converting the detected deviation into numerical information representative of arcuate displacement;
correlating said numerical information with specific points on said first cylinder;
determining from the correlated numerical information the point on said first cylinder where the maximum amount of arcuate displacement occurs;
obtaining from said numerical information a digital number representative of the maximum amount of arcuate displacement;
positioning said first cylinder such that said first cylinder is arculately displaced by its maximum amount in a set direction; and
displacing said second cylinder at the center in said set direction in response to said digital figure while keeping the ends of said second cylinder stationary.

17. An apparatus for centering two concentric cylinders having different diameters and positioned one within the other, said apparatus comprising:
means for supporting the cylinder having the smaller diameter within the cylinder having the greater diameter so that the ends of the cylinder having a smaller diameter are centered with respect to the cylinder having a greater diameter;

means for establishing a linear reference line along the length of one cylinder;

means for rotating said one cylinder about its center point;

means for determining the arcuate displacement of said one cylinder, said determining means being operable to detect the deviation of said one cylinder from said reference line as the cylinder is rotated about its center point; and means for arcuately displacing the other cylinder to conform with the determined displacement of said one cylinder.

18. The invention in claim 17 including means for converting the detected deviation into numerical information representative of arcuate displacement.

19. The invention in claim 17 wherein said means for establishing a linear reference line is comprised of an energy source positioned at one end of said one cylinder, said energy source being operable to project an energy signal along the length of said one cylinder.

20. The invention in claim 19 wherein said determining means includes a means for receiving the energy signal from said energy source at the other end of said one cylinder.

21. The invention in claim 17 wherein said means for establishing a linear reference line is comprised of an illuminating source located at one end of said one cylinder, said illuminating source being operable to project a beam of light having a narrow depth and a width greater than the amount of arcuate displacement along the length of said one cylinder so that the width of said light beam is perpendicular to a line tangent to said one cylinder.

22. The invention in claim 21 wherein said determining means is comprised of:

a photo receiver means positioned at the other end of said one cylinder, said photo receiver means being operable to select a reference point along the width of said reference line and to detect the amount of deviation from said reference point caused by the arcuate displacement of said one cylinder; and means for converting the detected deviation into numerical information representative of arcuate displacement.

23. An apparatus for centering two concentric cylinders having different diameters and positioned one within the other, said apparatus comprising;

support means upon which the first cylinder having the greater diameter can be positioned so as to eliminate any arcuate displacement of said first cylinder;

means for supporting the second cylinder having the smaller diameter within the first cylinder so that the ends of said second cylinder are centered with respect to the first cylinder;

means for establishing a linear reference line along the length of said second cylinder;

means for rotating said second cylinder about its center point;

means for determining the arcuate displacement of said second cylinder, said determining means being operable to detect the deviation of said second cylinder from said reference line as the cylinder is rotated about its center point; and means for arcuately displacing said first cylinder to conform with the determined displacement of said second cylinder.

24. The invention in claim 23 wherein said determining means includes means for converting the detected arcuate displacement into numerical information.

25. The invention in claim 24 wherein said means for arcuately displacing said first cylinder is comprised of means for displacing said support frame by an amount related to the maximum arcuate displacement of said second cylinder.

26. The invention in claim 25 wherein said displacing means is comprised of a jack means operable to lower said support frame by an amount related to the maximum arcuate displacement of said second cylinder.

27. The invention in claim 23 including means for obtaining a digital number representative of the maximum amount of arcuate displacement of said second cylinder.

28. The invention in claim 27 wherein said means for arcuately displacing said first cylinder is comprised of means for displacing said support frame a set amount in response to said digital number.

29. The invention in claim 28 wherein said displacing means is comprised of a jack means operable to lower said support frame a set amount in response to said digital number.

* * * * *